Dec. 21, 1965     N. P. SOGOIAN     3,224,791
HANGER FOR VEHICLE SPLASH GUARDS
Filed Dec. 10, 1962

INVENTOR.
NASH P. SOGOIAN
BY
ATTORNEYS

United States Patent Office 3,224,791
Patented Dec. 21, 1965

3,224,791
HANGER FOR VEHICLE SPLASH GUARDS
Nash P. Sogoian, 1417 21st St., Detroit 16, Mich.
Filed Dec. 10, 1962, Ser. No. 243,260
9 Claims. (Cl. 280—154.5)

The present invention relates to a hanger for vehicular mud flaps and more particularly to such a device having means permitting deflection of the mud flap support member without damage if the support member accidentally comes into contact with an obstruction.

In many localities it is mandatory that trucks, trailers and other similar vehicles be provided with mud flaps to prevent damage to others from rocks and other debris thrown by the wheels. The hangers for such mud flaps are often damaged by obstructions such as loading docks when the vehicle is backed into position for loading or unloading. Further, it has been found that hangers now commonly being used to secure mud flaps to vehicles such as trucks are not sufficiently resilient to prevent damage and loosening caused by vibrations as the vehicle is being used.

It is an object then of the present invention to increase the life of mud flap hangers for vehicles by providing a support member adapted to carry a mud flap and which is resiliently mounted to the vehicle.

It is a further object of the present invention to decrease the damage to mud flap support members by providing resilient means in said support members operable to permit the support members to deflect from a normal position when an obstruction is encountered.

It is yet another object of the present invention to reduce the accumulation of ice, snow and mud on vehicular mud flaps by providing a support member for such a mud flap having resilient means for mounting the support member to the vehicle, so that ice and snow will loosen through vibrations in the support.

Figure 1:
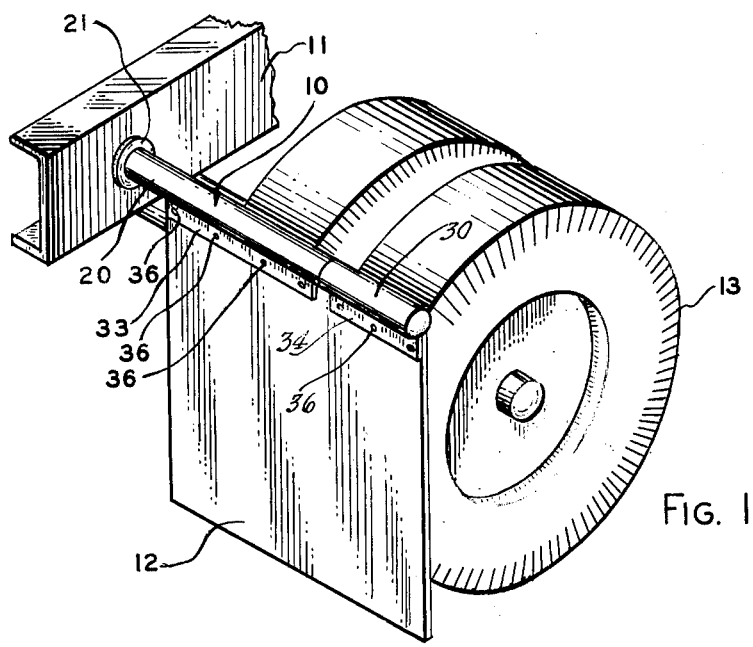

Still further objects and advantages of the present invention will readily occur to one skilled in the art to which the invention pertains upon reference to the drawings in which like reference characters refer to like parts throughout the several views and in which FIG. 1 is a perspective view of a mud flap assembly of the present invention.

Figure 2:
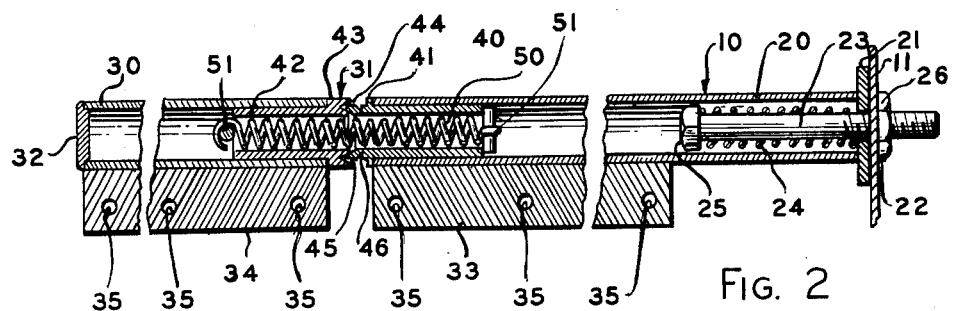
Figure 3:
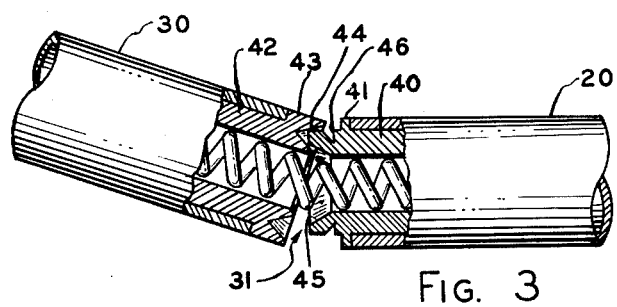

FIG. 2 is a longitudinal cross sectional view of a support member of the present invention, and FIG. 3 is a fragmentary longitudinal cross sectional view of the support member of the present invention enlarged somewhat for purposes of clarity and illustrating the support member in a deflected position.

Now referring to the drawings for a more detailed description of the present invention, FIG. 1 illustrates a mud flap hanger 10 of the present invention as being secured to a framing member 11 of a vehicle such as a truck or the like. The hanger 10 is adapted to carry a mud flap 12 in a position behind the wheels 13 of the truck.

As can best be seen in FIG. 2, the mud flap hanger 10 of the present invention preferably comprises an elongated tubular support member 20. A radially extending annular flange member 21 is secured to one end of the support member 20 and is provided with a central perforation 22. The perforation 22 is adapted to receive a bolt 23 and a spring member 24 is biased between the head 25 of the bolt 23 and the flange member 21. A nut member 26 is provided for the bolt 23 to provide the means by which the hanger 10 is secured to the frame 11.

A second elongated tubular support member 30 is carried at the free end of the support member 20 in a position normally axially aligned therewith by resilient means 31 which will be described in more detail below. A cap member 32 is removably carried in the free end of the support member 30.

Longitudinally extending flanges 33–34 are carried on the outer surface of the support members 20–30 respectively. Longitudinally spaced perforations 35 provide the means by which the mud flap 12 may be secured to the hanger 10 by bolts 36 or the like as can best be seen in FIG. 1.

The resilient means 31 as can best be seen in FIGS. 2–3 preferably comprises a tubular member 40 adapted to be axially carried in the free end of the support member 20 and having a radially extending annular flange portion 41 which limits inward axial movement of the tubular member 40 with respect to the support member 20. A similar tubular member 42 is adapted to be carried in the end of the support member 30 and is provided with a radially extending flange portion 43 which limits inward axial movement of the tubular member 42 with respect to support member 30.

The end of the tubular member 42 adjacent the tubular member 40 is preferably provided with an axially extending V-shaped recess 44 which provides the seat for a substantially complementary shaped end portion 45 of the tubular member 40. The tubular member 40 is provided with a radially extending inclined recess 46 spaced longitudinally from the end portion 45.

A spring member 50 is positioned by transverse pin members 51 and urges the end portion 45 of the tubular member 40 to seat in the recess 44 of the tubular member 42 and thus urges the support members 20–30 toward a position of axial alignment. The tubular members 40–42 are adapted to be secured to the support members 20–30 respectively by welding (not shown) or some other like method.

The spring member 50 is sufficiently strong enough to hold the support members 20–30 in a position of axial alignment. If, however, an obstacle is encountered by the support member 30 the resilient means 31 will permit the support member 30 to move angularly with respect to the support member 20 as can best be seen in FIG. 3. This will reduce breakage which often occurs when a truck or other vehicle is backed into a loading dock or the like. The spring member 24 provides a resilient mounting on the frame 11 which permits the support member 20 to deflect with respect to the frame member 11 when that member encounters an obstacle. Further the resilient means 31 and the spring member 24 provide a limited amount of resiliency to the hanger 10 which has been found to have the result of reducing the accumulation of ice, snow and mud on the hanger 10 and the mud flap 12.

It is apparent that any number of resilient means 31 could be provided in a mud flap hanger without departing from the spirit of the invention. In some instances it may be desirable to eliminate the resilient means 31 and use only the resilient mounting means which has been described.

It is also apparent that although I have described but one embodiment of the present invention many changes and modifications can be made without departing from the spirit of the invention or the scope of the appended claims.

I claim:
1. A hanger for a vehicular mud flap or the like comprising
   (a) an elongated tubular support member,
   (b) means carried longitudinally on said support member for securing a mud flap thereto,
   (c) means carried at one end of said support member for mounting said support member to a vehicle,
   (d) said mounting means including a perforated plate member secured to the end of said support member, a bolt having a head portion carried within said support member and a threaded shank portion extending through said plate member exteriorly of said support member to be secured to said vehicle and a spring member within said support member encompassing said bolt and being compressed between said head portion and said plate member,
(e) a second elongated tubular support member carried at the free end of said first mentioned tubular support member and in axial alignment therewith, and
(f) resilient means carried intermediate said first mentioned support member and said second support member.

2. The device as defined in claim 1 and in which said resilient means comprises a spring carried in axial alignment with said first mentioned support member and said second support member.

3. In combination
(a) an elongated support member,
(b) means being provided at one end of said support member for mounting said support member to a vehicle in a first position,
(c) a first resilient means carried intermediate said support member and said mounting means,
(d) a second elongated support member,
(e) means carrying said second support member at the free end of said first mentioned support member and in axial alignment therewith,
(f) said carrying means comprising a first tubular member carried in the free end of said first mentioned support member, a second tubular member carried in the end of said second support member adjacent said first tubular member, one of said tubular members having an enlarged free end portion adapted to receive the free end portion of the other of said tubular members,
(g) resilient means biasing said tubular members axially toward each other,
(h) a mud flap and means securing said mud flap to said support members.

4. In combination
(a) an elongated support member,
(b) means being provided at one end of said support member for mounting said support member to a vehicle in a first position,
(c) resilient means provided intermediate said support member and said mounting means whereby a lateral force directed against said support member sufficient to overcome said resilient means will cause said support member to deflect angularly with respect to said first position,
(d) a second support member,
(e) means resiliently securing said second support member to the free end of said first mentioned support member and in axial alignment therewith, and
(f) a mud flap and means securing said flap to said support members.

5. In combination
(a) an elongated support member,
(b) means being provided at one end of said support member for mounting said support member to a vehicle in a first position,
(c) a second elongated support member,
(d) means carrying said second support member at the free end of said first mentioned support member and in axial alignment therewith, (e) said carrying means comprising a first tubular member carried in the free end of said first mentioned support member, a second tubular member carried in the end of said second support member adjacent said first tubular member, one of said tubular members having reduced portion and the other of said tubular members having an annular recess receiving said reduced portion,
(f) resilient means urging said reduced portion to seat in said recess, and
(g) a mud flap and means securing said mud flap to said support members.

6. The combination as defined in claim 5 and in which said recess is substantially V-shaped in longitudinal section and said reduced portion is provided with a radially extending inclined recess adapted to receive the free edge of the other of said tubular members when said tubular members are deflected with respect to one another.

7. The combination as defined in claim 6 and including resilient means carried intermediate said first mentioned support member and said mounting means to resiliently secure said first mentioned support member to said mounting means.

8. In combination
(a) an elongated first support member having a longitudinal axis,
(b) means carried at one end of said first support member for mounting same to a vehicle in a position such that said longitudinal axis of said first support member extends substantially horizontally,
(c) said first support member having a free end horizontally spaced from said mounting means when said first support member is mounted to said vehicle,
(d) an elongated second support member having a longitudinal axis and an end portion,
(e) means securing said end portion to said free end of said first support member, said securing means including a resilient member urging said support members toward a position in which said longitudinal axes of said support members are in an aligned and substantially horizontally extending position whereby said second support member will deflect angularly with respect to the longitudinal axis of said first support member upon a lateral force being directed against said second support member sufficient to overcome said resilient member, and
(f) a mud flap and means securing said mud flap to said support members.

9. The combination as defined in claim 8 and in which said mounting means includes a second resilient member urging said first support member toward a normal position with respect to said vehicle whereby said first support member will deflect from said normal position upon a lateral force being directed against said first support member sufficient to overcome said second resilient member.

References Cited by the Examiner
UNITED STATES PATENTS

| | | | |
|---|---|---|---|
| 1,947,525 | 2/1934 | Hume | 280—154.5 |
| 2,397,151 | 3/1946 | Mitchell. | |
| 2,640,714 | 6/1953 | Garner et al. | 280—154.5 |
| 2,652,266 | 9/1953 | Miller | 280—154.5 |
| 2,801,867 | 8/1957 | Childreth | 280—154.5 |
| 3,088,751 | 5/1963 | Barry et al. | 280—154.5 |

A. HARRY LEVY, *Primary Examiner.*

LEO FRIAGLIA, *Examiner.*